US008640105B2

(12) United States Patent
Yaffe (10) Patent No.: US 8,640,105 B2
(45) Date of Patent: Jan. 28, 2014

(54) METHOD AND SYSTEM FOR DEBUGGING A JOB RUNNING ON A LEGACY SYSTEM

(75) Inventor: Lior Yaffe, Hadera (IL)

(73) Assignee: Software AG, Darmstadt (DE)

( * ) Notice: Subject to any disclaimer, the term of this patent is extended or adjusted under 35 U.S.C. 154(b) by 418 days.

(21) Appl. No.: 12/929,538

(22) Filed: Jan. 31, 2011

(65) Prior Publication Data

US 2012/0185829 A1 Jul. 19, 2012

(30) Foreign Application Priority Data

Jan. 13, 2011 (EP) ..................................... 11150817

(51) Int. Cl.
*G06F 9/44* (2006.01)
(52) U.S. Cl.
USPC ............................ 717/125; 717/124; 717/129
(58) Field of Classification Search
None
See application file for complete search history.

(56) References Cited

U.S. PATENT DOCUMENTS

| 6,412,106 | B1* | 6/2002 | Leask et al. ................... 717/124 |
| 6,658,650 | B1 | 12/2003 | Bates |
| 6,785,884 | B1* | 8/2004 | Rieschl ......................... 717/129 |
| 7,055,140 | B2* | 5/2006 | Bystricky et al. .............. 717/129 |
| 7,111,281 | B2* | 9/2006 | Bates et al. ................... 717/129 |
| 7,401,323 | B2* | 7/2008 | Stall et al. .................... 717/130 |
| 2002/0087948 | A1* | 7/2002 | Dzoba ........................... 717/124 |
| 2004/0128655 | A1* | 7/2004 | Bates et al. ................... 717/129 |
| 2004/0210876 | A1* | 10/2004 | Stall et al. .................... 717/127 |
| 2005/0066312 | A1* | 3/2005 | Barsness et al. ............. 717/129 |
| 2006/0288332 | A1* | 12/2006 | Sagar et al. ................... 717/124 |
| 2007/0283330 | A1* | 12/2007 | Bates ............................ 717/129 |
| 2009/0089742 | A1 | 4/2009 | Nagulu et al. |
| 2009/0183142 | A1* | 7/2009 | Hoban et al. .................. 717/125 |
| 2010/0235815 | A1* | 9/2010 | Maybee et al. ............... 717/125 |
| 2012/0084758 | A1* | 4/2012 | Bates ............................ 717/125 |
| 2012/0167056 | A1* | 6/2012 | Brunswig et al. ............. 717/129 |

OTHER PUBLICATIONS

Regelson et al. Debugging Practices for Complex Legacy Software Systems. International Conference on Software Maintenance, Sep. 1994, pp. 137-143, Retrieved on [Sep. 11, 2013] Retrieved from the Internet: URL<http://ieeexplore.ieee.org/stamp/stamp.jsp?tp=&arnumber=336781 >.*
Werner et al.Supporting Activity-centric Collaboration through Peer-to-Peer Shared Objects. Proceedings of the 2003 international ACM SIGGROUP conference on Supporting group work. 2003, pp. 115-124, Retrieved on [Sep. 12, 2013] Retrieved from the Internet: URL<http://dl.acm.org/citation.cfm?id=958179>.*
ApplinX Legacy Integration Suite. A Technical Overview White Paper. www.sabratec.com. Apr. 7, 2011. Xp-002632001.
Gantner et al., "Debugging RPG IV Programs—The WDSC Way", [Online]—http://www.ibmsystemsmag.com/ibmi/enewsleterexclusive/18995p2.aspx, Jan. 2008, 5 pages.
SystemINetwork, "STRDGB Can Be GUI", Article ID: 20545, [Online]—http://systeminetwork.com/article/strdbg-can-be-gui, Feb. 24, 2005, 3 pages.

* cited by examiner

*Primary Examiner* — Thuy Dao
*Assistant Examiner* — Cheneca Smith
(74) *Attorney, Agent, or Firm* — Nixon & Vanderhye PC (57) ABSTRACT

A computer-implemented method for debugging a job running on a legacy system is provided. The job to be debugged is identified by programmatically reading a screen provided by the legacy system that displays a list of active jobs of the legacy system via screen scraping. Source code that corresponds to the identified job is programmatically retrieved. A breakpoint is programmatically created in the retrieved source code.

11 Claims, 13 Drawing Sheets

| Variable | Value | Description |
|---|---|---|
| $program | SECTIONR | Program name |
| $library | LY | Program library name |
| $device | QPADEV05WT | Unique identifier of the display device |
| $user | LYAF | The username of the user job |
| $job_number | 220954 | Unique identifier of the user job |

Fig. 8c

```
                    Display Program Information
Program . . . . . . . :  SECTIONR      Library . . . . . . . :  LY
Owner . . . . . . . . :  LYAF
Program attribute . . :  [RPG:]

Program creation information:
  Program creation date/time . . . . . . . . . . . :  10/21/10  13:09:10
  Type of program . . . . . . . . . . . . . . . . :  [OPM:]
  Source file . . . . . . . . . . . . . . . . . . :  QRPGSRC
    Library . . . . . . . . . . . . . . . . . . . :  LY
  Source member . . . . . . . . . . . . . . . . . :  SECTIONR
  Source file change date/time . . . . . . . . . . :  02/02/03  12:36:49
  Observable information . . . . . . . . . . . . . :  *ALL
  User profile . . . . . . . . . . . . . . . . . . :  *USER
  Use adopted authority . . . . . . . . . . . . . :  *YES
  Fix decimal data . . . . . . . . . . . . . . . . :  *NO
  Teraspace enabled . . . . . . . . . . . . . . . :  *NO More...
```

| Variable | Value | Description |
|---|---|---|
| $pgm_type | RPG | Program language identifier |
| $pgm_arch_type | OPM | Language identifier OPM/ILE |

Fig. 8d

```
                              Display Spooled File
File . . . . . . :  QPDSPPGM                                  Page/Line  1/1
Control . . . . .   ______                                    Columns    1 - 138
Find . . . . . .    ________________
*...+....1....+....2....+....3....+....4....+....5....+....6....+....7....+....8....+....9....+....0....+....1....+....2....+....3
   10/24/10       Display Program References
OSPPGMREF Command Input
   Program . . . . . . . . . . . . . . . . :  SECTIONR
     Library . . . . . . . . . . . . . . . :  LY
   Output  . . . . . . . . . . . . . . . . :  *
   Object types  . . . . . . . . . . . . . :  *PGM
   Program . . . . . . . . . . . . . . . . :  SECTIONR
     Library . . . . . . . . . . . . . . . :  LY
     Text 'description'. . . . . . . . . . :
     Number of objects referenced  . . . . :        2
┌──────────────────────────────────────────────────────────┐
│  Object . . . . . . . . . . . . . . . . :  SECTIONS     │
└──────────────────────────────────────────────────────────┘
     Library . . . . . . . . . . . . . . . :  LY
     Object type . . . . . . . . . . . . . :  *FILE
     File name in program  . . . . . . . . :  SECTIONS
     File usage  . . . . . . . . . . . . . :  Input
     Number of record formats. . . . . . . :        1
       Record Format   Format Level Identifier   Field Count
       SECTREC         3C6060A39A03A                    7
┌──────────────────────────────────────────────────────────┐
│  Object . . . . . . . . . . . . . . . . :  SECTINQ      │
└──────────────────────────────────────────────────────────┘
                                                              More...
F3=Exit  F12=Cancel  F19=Left  F20=Right  F24=More keys
```

| Variable | Value | Description |
|---|---|---|
| $files[] | LY/SECTIONS, LY/SECTINQ | List of input files used by the program |

Fig. 8e

```
                              Display Spooled File
File ......: QPDSPFO                                      Page/Line  2/4
Control ..... B                                           Columns    1 - 130
Find ......
+....+....1....+....2....+....3....+....4....+....5....+....6....+....7....+....8....+....9....+....0....+....1....+....2....+....3
   Print                            PRINT
     Print allowed ..............:  No
     Display size (Lines Positions) ......: OSPSIZ  24 80
  ┌─────────────────┐
  │Record Format List│
  └─────────────────┘
                      Record Format Level   Format
   Format    Fields  Length  Identifier   Type
   CRSEINQ       9      21   143F6FE856CA9  Normal
     Text ..................:
   SFLSECT      10      43   2312385380307  SFL
     Associated format ...........:         CTLSECT
     Text ..................:
   CTLSECT      12      23   891023965C263  SFLCTL
     Associated format ...........:         SFLSECT
     Text ..................:
   FOOTER        3       3   8871722EAC91A  Normal
     Text ..................:
   Total number of formats ...........:    4
   Total number of fields ...........:    34
   Total record length ............:    98
                                                                         Bottom
 F3=Exit  F12=Cancel  F19=Left  F20=Right  F24=More keys
```

| Variable | Value | Description |
|---|---|---|
| $record_formats[] | CRSEINQ SFLSECT CTLSECT FOOTER | List of record formats in the display file used by the program |

Fig. 8f

```
                    Display Module Source

Program:   DTLY          Library:   LY
    1      FDTLY     CF  E                    WORKSTN
    2      C             *IN03    DOWEQ*OFF
    3      C                      EXFMTDATAREC
    4      C                      EXSR CPYDAT
    5      C             *IN03    IFEQ *ON
    6      C                      LEAVE
    7      C                      ENDIF
    8      C                      ENDDO
    9      C                      SETON                      LR
   10      C                      RETRN
   11      C*** CPYDAT - COPY INPUT FIELDS TO OUTPUT FIELDS
   12      CSR           CPYDAT   BEGSR
   13      C                      MOVE IED3      OED3
   14      C                      MOVE IED3      SED3
   15      C                      MOVE IEDD      OEDD
                                                        More...
Debug . . .   ______________________________________________

F3=End program   F6=Add/Clear breakpoint   F10=Step   F11=Display variable
F12=Resume       F17=Watch variable   F18=Work with watch   F24=More keys
Breakpoint at line 4
```

Fig. 8g

```
                    Display Module Source

Program:   SECTIONR      Library:   LY
    1      FSECTIONSIF E           K       DISK
    2      FSECTINQ  CF E                  WORKSTN
    3      F                                RRN   KSFILE SFLSECT
    4      C             KEY      KLIST
    5      C                      KFLD            CNO
    6      C             *IN03    DOWEQ*OFF
    7      C                      EXFMT CRSEINQ
    8      C             *IN03    IFEQ *OFF
    9      C             KEY      CHAINSECTIONS           10
   10      C             *IN10    IFEQ *ON
   11      C                      SETON                   90
   12      C                      Z-ADD98765     FREE1
   13      C                      Z-ADD12345     FREE3
   14      C                      ELSE
   15      C                      SETOF                   94
                                                        More...
Debug . . .   ______________________________________________

F3=End program   F6=Add/Clear breakpoint   F10=Step   F11=Display variable
F12=Resume       F17=Watch variable   F18=Work with watch   F24=More keys
Already at top of area.                                            +
```

METHOD AND SYSTEM FOR DEBUGGING A JOB RUNNING ON A LEGACY SYSTEM

This application claims priority to EP 11 150 817.2 filed 13 Jan. 2011, the entire contents of which is hereby incorporated by reference.

TECHNICAL FIELD

The present invention relates to a computer-implemented method and a system for debugging a job running on a legacy system.

THE PRIOR ART

Organizations oftentimes use applications running on legacy systems, such as mainframe systems or the Application System/400 (AS/400) of International Business Machines Corp. (IBM), which have been in place for a long time and serve for driving mission-critical computations. Legacy systems typically communicate with one or more terminal emulators, wherein the terminal emulators serve for displaying text-based screens (so-called "green screens") of a legacy application running on the legacy system and allowing users to input data into data fields of the screens. The user input is then transmitted back to the legacy system, which responds by transmitting the next screen to the terminal emulator. In summary, a session of a user with a legacy system can thus be regarded as a sequence of displayed screens (screen instances) connected by user inputs.

However, analyzing such legacy systems and their applications for errors/bugs, a task generally known as debugging, is extremely difficult. This is because the source code of legacy systems and their applications is typically written in first-generation programming languages such as COBOL, RPG, CL, or the like, and there is typically no personnel available that can correctly understand the code due to a lack of expertise with deprecated programming languages or a lack of documentation of the code.

In the prior art, approaches are known for debugging screen-based legacy applications. For example, U.S. Pat. No. 6,658,650 "Service entry point for use in debugging multi-job computer programs" of IBM concerns an AS/400 debugger attachment process when multiple jobs of an AS/400 system have to be debugged simultaneously. In particular, the document proposes a toolkit for letting a user set breakpoints manually in the source code of the job to be debugged, which involves the following manual tasks: (1) identify the program running the current "green screen" (the program may be written in RPG, COBOL, CL, or the like; in most cases there are no visual clues on the "green screen"); (2) inside the program locate the READ command which initiated the display of the current "green screen" (this step requires familiarity with the program design and code); (3) start a second AS/400 job, identify the job to debug and call the STRSRVJOB command with the correct parameters; (4) start a debug session using the STRDBG command and place the breakpoint on the line following the READ statement located in step (2). This manual process is tedious and error-prone and requires extensive knowledge about the underlying AS/400 program.

In order to somewhat ease the manual effort when debugging AS/400 programs, a number of tools with graphical user interfaces (GUIs) were also developed for the AS/400, e.g. the WSDC Graphical Debugger (cf. http://www.ibmsystemsmag.com/ibmi/enewsletterexclusive/18995p2.a spx) and the STRDBG GUI (cf. http://systeminetwork.com/article/strdbg-can-be-gui). These tools essentially mimic the "green screen" procedures graphically, however, they still require significant knowledge about the source code of the particular program to be debugged and therefore do not help to provide reliable and error-proof debugging environments.

It is therefore the technical problem underlying the present invention to provide an approach for debugging jobs of legacy systems that is more reliable and less error-prone as compared to the known manual approaches and thereby at least partly overcomes the above explained disadvantages of the prior art.

3. SUMMARY OF THE INVENTION

This problem is according to one aspect of the invention solved by a computer-implemented method for debugging a job running on a legacy system. In the embodiment of claim 1, the method comprises the following steps:
  a. identifying the job to be debugged, wherein the identifying comprises programmatically reading a screen provided by the legacy system that displays a list of active jobs of the legacy system by means of screen scraping;
  b. programmatically retrieving the source code that corresponds to the job identified in step a. by means of screen scraping; and
  c. programmatically creating at least one breakpoint in the source code retrieved in step b.

Accordingly, the embodiment defines a computer-implemented debugging method for jobs of legacy systems—preferably interactive AS/400 jobs displaying a specific screen of an AS/400 system—that performs the task of setting up breakpoints within the source code of the job to be debugged in a programmatic, i.e. fully automated way, which is therefore reliable, reproducible and error-proof. Importantly, since typical "green screen" applications of a legacy system merely display their screens in a human-readable text-based manner and are thus not "understandable" by computer-programs, the method of the present invention uses screen scraping technology in order to programmatically, i.e. fully automatically, read the contents of the "green screens", e.g. by using products such as ApplinX of applicant.

Screen scraping technology refers to the ability to programmatically connect to a legacy system (e.g. mainframe) application, to identify screens and to read and/or update information into fields on a given screen. In a preferred embodiment, the product ApplinX of applicant is used to first identify all screens that are involved in the automated debugging process, then define the relevant input and or output fields on each screen and then create a path procedure (e.g. a programmable script) which navigates during runtime between the legacy system screens and reads and/or updates information according to the script. The result is a standalone application that can be invoked e.g. from a web service or a browser URL and will parse the legacy system screens and create the desired breakpoint(s).

In a preferred embodiment, the following pre-requisites are performed before utilizing the method of the invention: the AS/400 program to be debugged is compiled with debug information, and the ApplinX job has sufficient privileges to invoke the System request dialog on another job (see also the detailed description further below).

In one aspect of the present invention, the step of identifying the job to be debugged comprises filtering the list of active jobs of the legacy system based on at least one selection criterion selected from the group comprising username of a user that initiated the debugging, device name, job number and/or job status.

In a further aspect, the step of identifying the job to be debugged comprises letting a user select the job to be debugged, if the list of active jobs of the legacy system comprises more than one candidate job.

Additionally or alternatively, the method may comprise the further step of identifying a source program language of the job to be debugged, wherein the identifying comprises programmatically reading a screen provided by the legacy system that displays program information of a program associated with the job to be debugged.

In yet another aspect, the step of programmatically retrieving the source code corresponding to the identified job to be debugged comprises programmatically invoking at least one command on the legacy system that causes the legacy system to output a screen that displays the source code of the job to be debugged.

Furthermore, the step of programmatically creating a breakpoint in the source code of the job to be debugged may comprise the step of determining whether the source code comprises at least one instruction relating to displaying information on an interactive screen of the legacy system and the step of inserting the at least one breakpoint after the at least one determined instruction. Preferably, a breakpoint is (automatically) created after each determined instruction and the method comprises the further step of starting a debugging session at one of the breakpoints and (automatically) removing all other breakpoints.

The step of determining whether the source code comprises at least one instruction relating to displaying information on an interactive screen of the legacy system may be performed by one of a plurality of language-specific source code parsers. Preferably, the plurality of language-specific source code parsers use regular expressions and/or lexical analysis to determine whether the source code comprises at least one instruction relating to displaying information on a screen of the legacy system.

The present invention also concerns a computer program comprising instructions for implementing any of the above-explained methods.

Further, a system for debugging a job running on a legacy system is disclosed, wherein the system comprises means for identifying the job to be debugged, wherein the means for identifying are adapted for programmatically reading a screen provided by the legacy system that displays a list of active jobs of the legacy system by means of screen scraping; means for programmatically retrieving the source code that corresponds to the job to be debugged by means of screen scraping; and means for programmatically creating at least one breakpoint in the source code that corresponds to the job to be debugged.

Further advantageous modifications of embodiments of the above system of the invention are defined in further dependent claims.

4. SHORT DESCRIPTION OF THE DRAWINGS

In the following detailed description, presently preferred embodiments of the invention are further described with reference to the following figures.

5. DETAILED DESCRIPTION

Certain embodiments of the present method and system described hereinafter relate to simplifying the process of attaching a debugger to an interactive AS/400 job that displays a specific screen by automating the task of setting up breakpoints and creating a service job using screen scraping technology.

In order to automate the debugger attachment process, the following sub-processes are preferably automated using the screen scraping technology of ApplinX of applicant in certain embodiments:

Identifying the job to debug:
From ApplinX, activate the AS/400 WRKACTJOB command to list the current jobs in the system. Using the username of the debugged job, scan the list of AS/400 jobs for the jobs created by the user and select all interactive jobs created by the user. If more than one job fits the selection criteria, present a job selection dialog to the user.

Identifying the running program and current READ command: Once the debugged job has been located, the ApplinX application will activate the System Request "Display Call Stack" option on the debugged job to determine the current program name as well as the job number and job name.

Attaching the debugger:
Using the information obtained in the previous steps, the ApplinX application will now activate the STRSRVJOB and STRDBG statements with the correct parameters in order to list the source of the currently running program. The source code is now listed by the ApplinX application, which scans the code and places a breakpoint right after the current READ statement of the currently running statement of the debugged job, so that when the user performs an action on the current screen, the ApplinX application will start the debugger at a breakpoint.

The next time a user of the debugged job executes an AID key, the job will stop in debug mode and control will pass to the ApplinX application for performing the actual debug operation.

The above objectives are in a preferred embodiment achieved by using a Mainframe web enablement tool such as ApplinX of applicant for screen scraping all or at least part of the following AS/400 operating system screens: "Work with Active Jobs", "Display Call Stack" and/or "Display Module Source".

Figure 1:
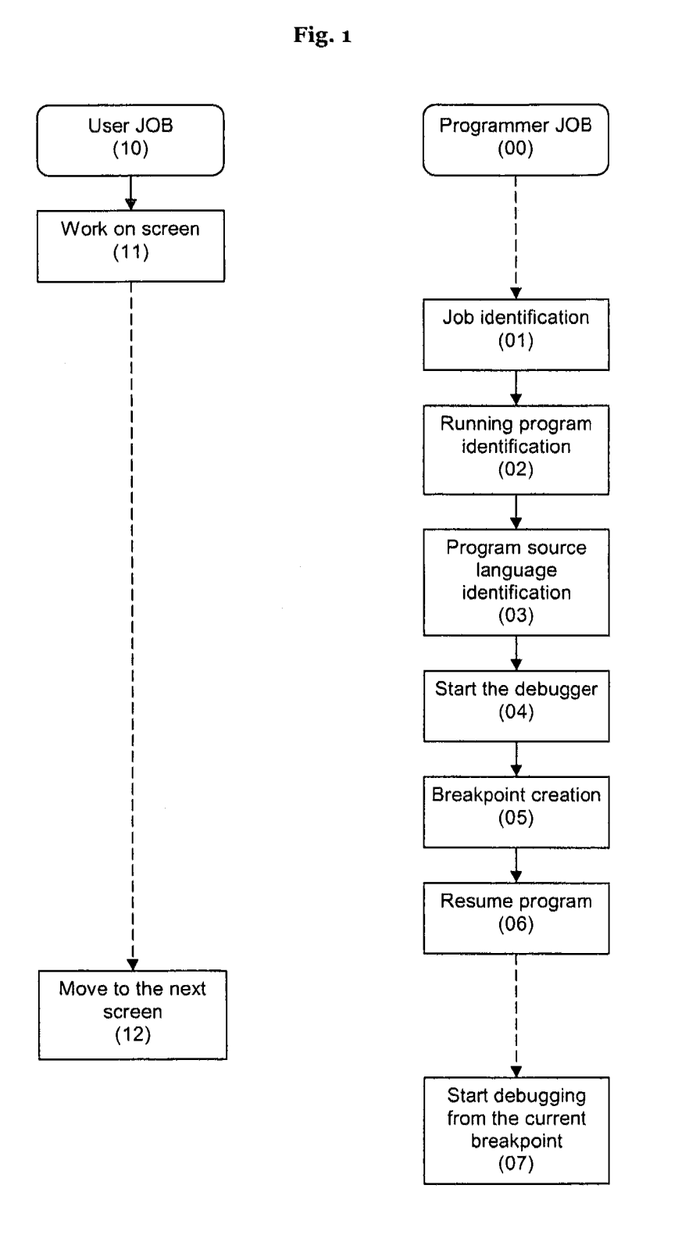
FIGS. 1-7: Flow charts of tasks performed when debugging a job running on a legacy system in accordance with embodiments of the present invention.
Figure 8A:
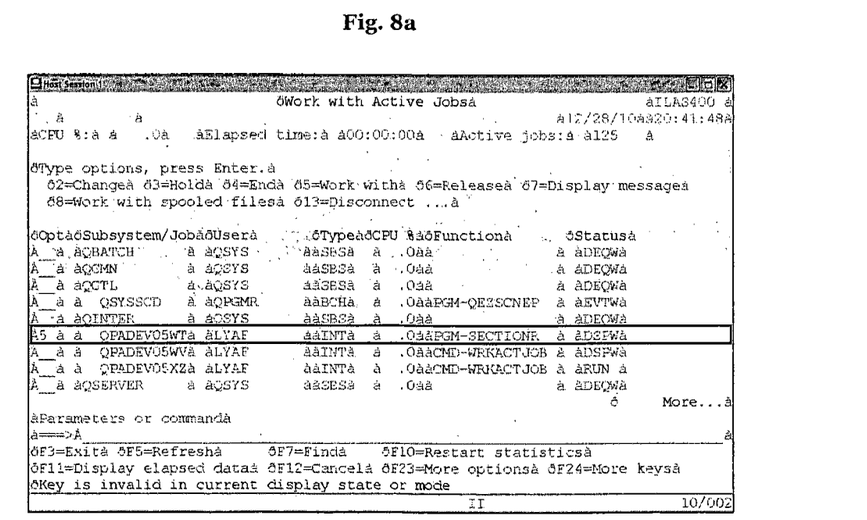
FIGS. 8a-g: Exemplary "green screens" and information programmatically extracted there from in accordance with embodiments of the present invention.

In the following, the overall debugging process in a presently preferred embodiment of the invention is described with respect to a method as schematically shown in FIG. 1. As can be seen, initially a user of the legacy system performs a normal task on the legacy system within a typical mainframe (legacy system) screen, which is indicated by step 11 "Work on Screen" in FIG. 1. Such a typical mainframe screen is shown in FIG. 8h. As can be seen, the exemplary screen "Course Inquiry" in FIG. 8h does not imply which source code is used or even which programming language was used to generate the screen. If it is desired to stop the user program in a debugger breakpoint on this screen, a way is needed to determine which mainframe program is running and which command is being executed to display the screen. These determinations are performed automatically by the method of the present invention, as will be described in the following.

Figure 2:
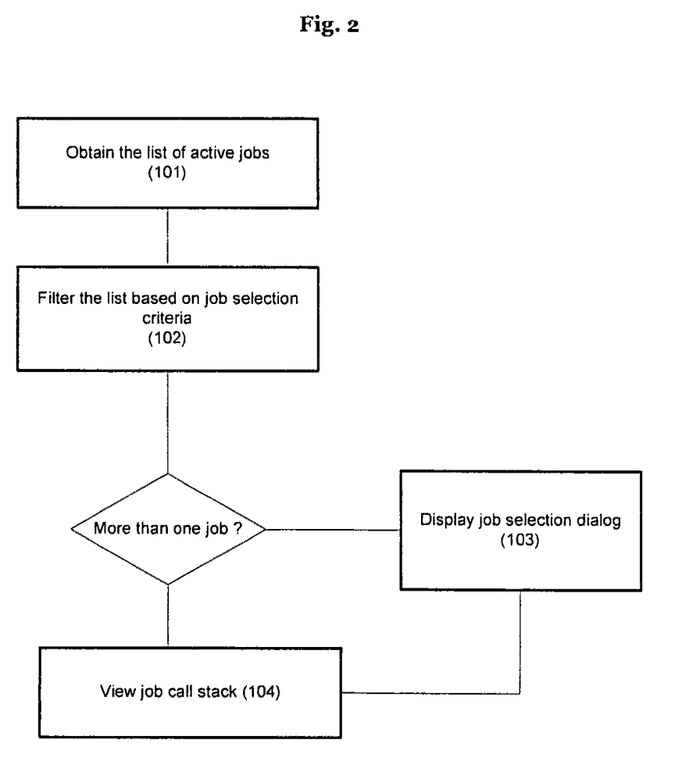

When the user is within a particular screen of the legacy system (such as the screen shown in FIG. 8h) and preferably initiates a debugging session, e.g. by pressing a corresponding button on a user interface, the actual method of the invention starts, which is shown on the right hand side of FIG. 1. Accordingly, the method undergoes steps 01 "Job Identification", step 02 "Running program identification", step 03 "Program source language identification", step 04 "Start the debugger", step 05 "Breakpoint creation" and step 06 "resume program". After the legacy program is resumed, the user regains control and may move to the next screen, as indicated by step 12. The method may then start debugging from the current breakpoint (which was automatically created by the method of the present invention), as shown in step 07. Each of the above-mentioned steps will be described in more detail in the following:

FIG. 2 shows a more detailed view of step 01 "Job Identification". As can be seen, a list of all active jobs within the legacy system is obtained in step 101. This is preferably performed by programmatically invoking suitable operating system screen(s) provided by the legacy system and programmatically extracting information there from by means of screen scraping. In one embodiment, this involves presenting a "Job Selection" dialog to the user, as exemplarily shown in FIG. 8i, where the user may input job selection criteria such as "user name", "job number" and/or "device id" (see above). Based on the input variables from the "Job Selection" dialog, an ApplinX session is preferably launched and login to the same AS/400 system used by the user job and the WRKACT-JOB command is programmatically typed. This results in the "Work with Active Jobs" screen shown in FIG. 8a. Subsequently, information is identified and extracted from the "Work with Active Jobs" screen provided by the AS/400 system. To this end, the "Work with Active Jobs" screen is preferably analyzed in advance by the ApplinX designer tool and the relevant fields are marked for extraction. An exemplary "Work with Active Jobs" screen with a list of active jobs is shown in FIG. 8a. The job indicated by the bounding box in FIG. 8a in this example shows the job to be debugged, namely the selected job for user LYAF (compare the "Job Selection" dialog explained further above). A preferred embodiment of the invention does not support the debugging of batch jobs, since batch jobs do not interface with the legacy system (mainframe) display system, whereas the invention is preferably concerned with setting up breakpoint(s) automatically on interactive screens.

The list of active jobs may be filtered based on job selection criteria in step 102. The job selection criteria may be defined by the user and comprise e.g. the username used for login into the AS/400 application to be debugged, the device name assigned to the user job by the AS/400 and/or the job number, which is a unique job identifier assigned by the AS/400 (cf. the "Job Selection" dialog explained further above). Further, the list of active jobs may be filtered based on job status information, such as Type="INT" indicating an interactive job, and/or Status="DSPW" indicating that the job is currently displaying a screen and is waiting for user input (cf. FIG. 8a).

If more than one possible job is identified in step 102, a user dialog may be created that shows the matching jobs and lets the user select one in step 103. If there are no matching jobs, an error message may be returned to the user.

Figure 8B:
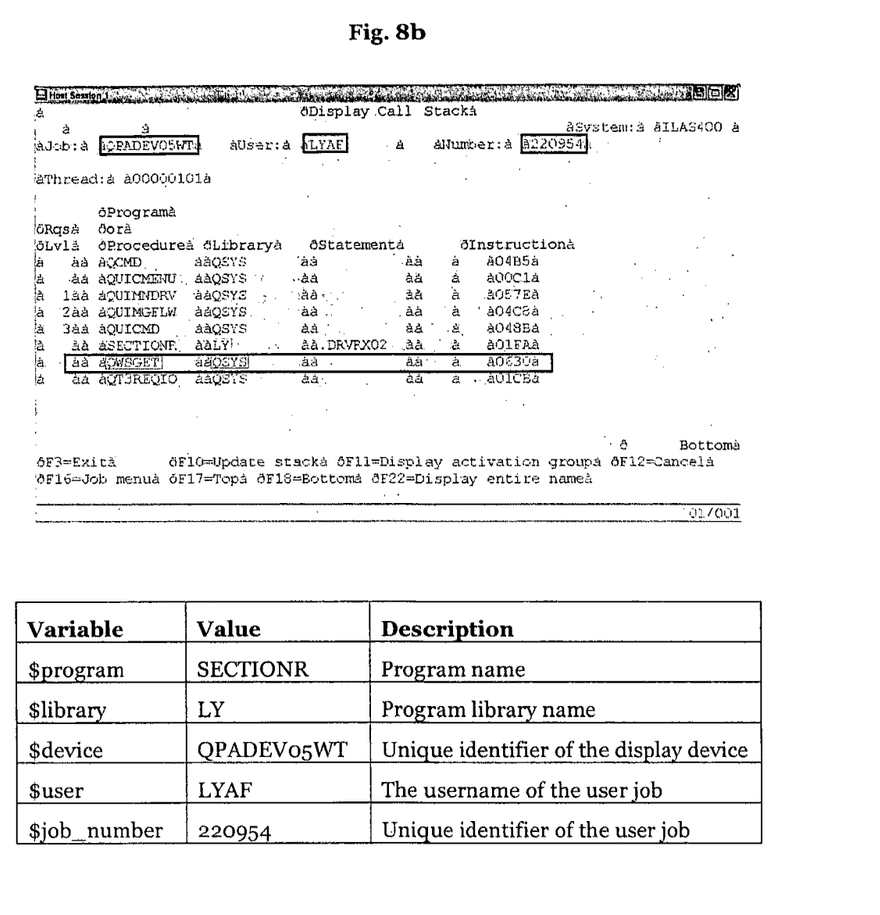

Once a single job is selected for being debugged, the method may programmatically focus the cursor on the selected job and programmatically invoke the option "5-Work With" in the "Work with Active Jobs" screen shown in FIG. 8a, followed by the option "11-Display call stack" on the selected job, which results in the legacy system showing a "Display Call Stack" screen in step 104, as shown in FIG. 8b. The "Display Call Stack" screen is an operating system screen of the AS/400 system that allows for inspecting the procedure call(s) performed by the legacy system job to be debugged. It should be appreciated that any other similar operating system screen may be used on other legacy systems to retrieve the procedure call(s) performed by the job to be debugged.

Figure 3:
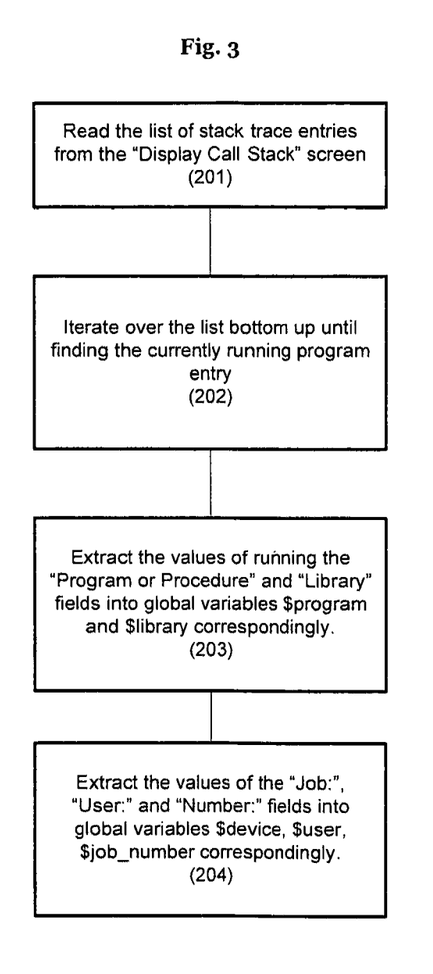

FIG. 3 shows a more detailed view of step 02 "Running program identification". As can be seen, in step 201 the list of stack trace entries, which represents the sequence of nested procedure calls performed by the legacy system program in order to display the interactive screen presented to the user, is read from the "Display Call Stack" screen (cf. FIG. 8b) invoked in step 104. In a preferred embodiment, this is done in a programmatic manner using screen extraction techniques, as e.g. provided by ApplinX of applicant. The output of the screen extraction step is shown in the table on the bottom of FIG. 8b. In step 202, the method iterates over the list of stack traces, preferably from the bottom up, since the list of stack traces is likely to span more than one mainframe (legacy system) screen. The ApplinX application preferably uses the following algorithm to determine the running program:

(1) Page down until getting an "Already at bottom of area." Message from the AS/400
(2) For each row in the call stack table
   a. Compare "Library" to "QSYS" and compare "Program" to "QWSGET"
   b. If match, move one row up (possibly page up if on the first row), extract the value of the "Library" column of the selected row into $library and the value of the "Program" column into $program. Exit.
   c. If no match, if the first row of the page is not reached, goto (2), else goto (3).
(3) Page Up. If a message "Already at top of area." is displayed, exit, else goto (2).

The program QWSGET from library QSYS implements the interface between the interactive user program and the AS/400 display system. Its existence in the call stack indicates that the user application now displays a screen to the user and is therefore ready to be debugged using the procedure explained herein. It should be appreciated that similar call stack entries may be used on other legacy systems to achieve a similar result.

In step 203, the values of the "Program or Procedure" and "Library" columns for the encountered row are stored in corresponding global variables (called "$program" and "$library" in the example of FIG. 3). In step 204, the values of the "Job:", "User:" and "Number:" fields (cf. the bounding boxes in FIG. 8b) are extracted into corresponding global variables, e.g. called "$device", "$user" and "$job_number". These fields are used by the STRSRVJOB command in order to attach the ApplinX application job to the user job. In this example, the "$"-sign indicates a global variable which can be passed between procedures.

Figure 4:
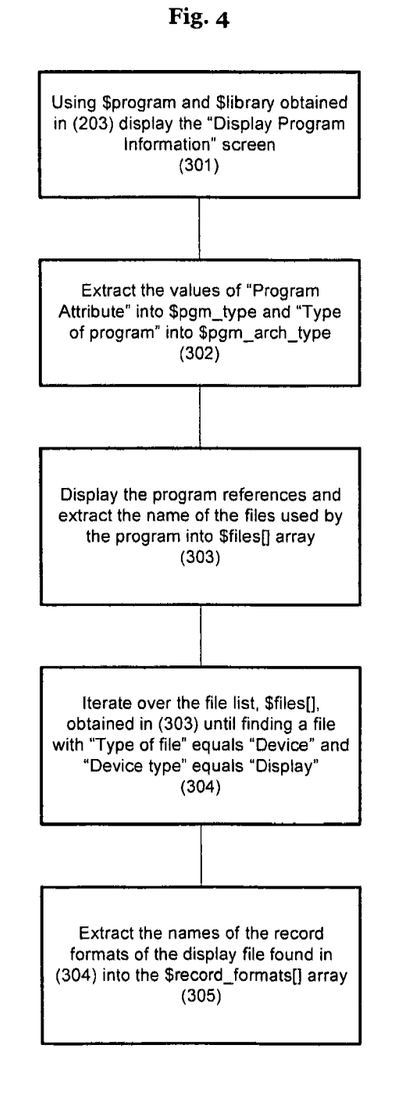

FIG. 4 shows a more detailed view of step 03 "Program source language identification". Each AS/400 interactive program relies on a display file which defines the interactive screen layout. A display file is further divided into record formats. The purpose of this step is to identify which record formats of the display file are being used by the AS/400 interactive program. These record formats will be later used in order to identify the READ command(s) from which breakpoints are required.

Figure 8C:
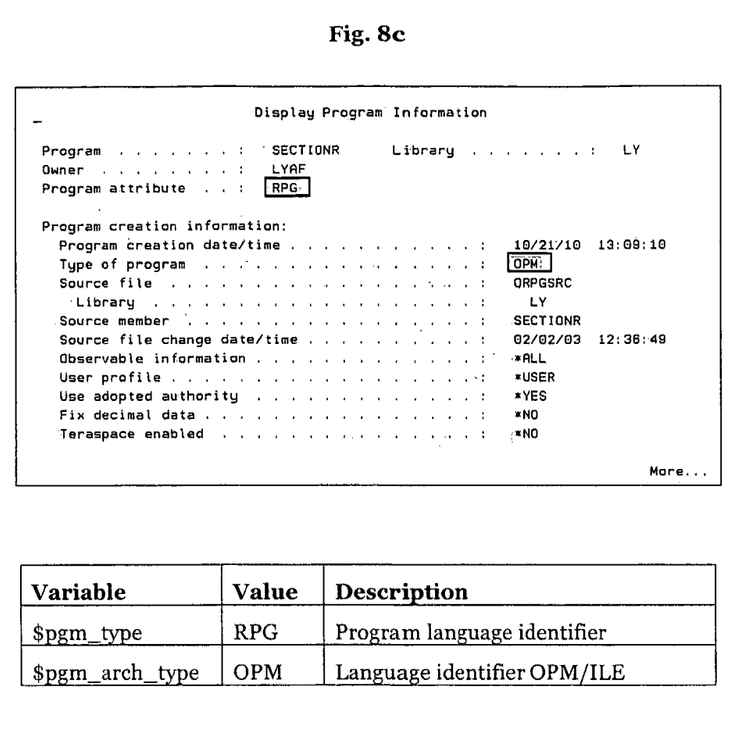

As can be seen, in step 301 the global variables $program and $library obtained in step 203 are used for displaying a "Display Program Information" screen (preferably by invoking the AS/400 command "DSPPGM PGM($library/$program)"), as exemplarily shown in FIG. 8c.

Figure 8D:
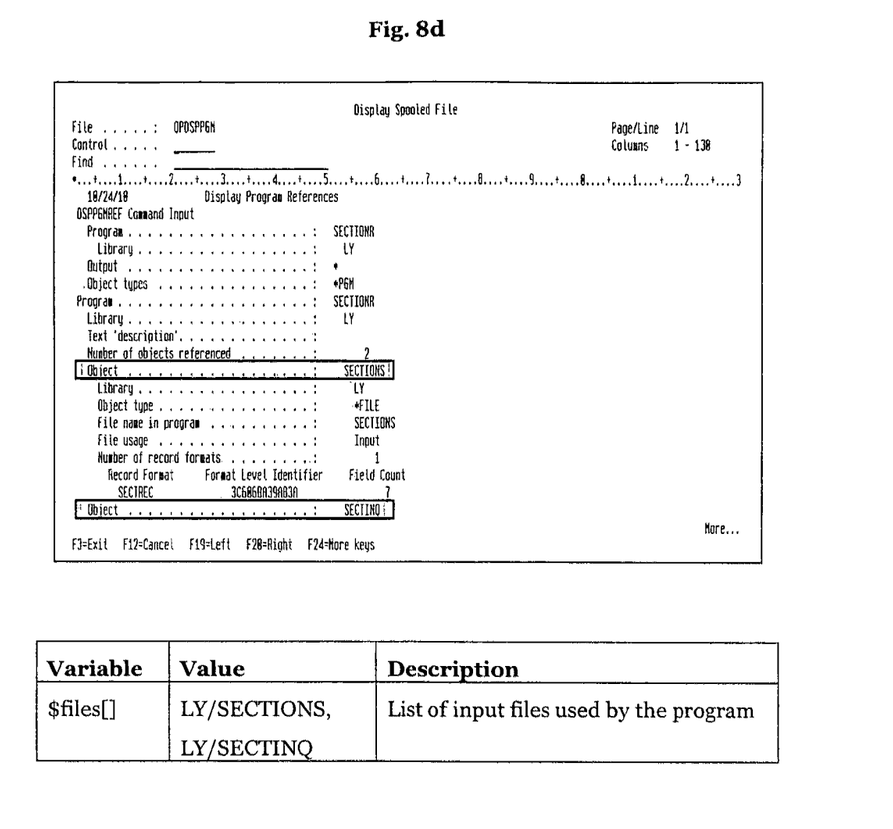

In step 302, the values of the "Program attribute" and "Type of program" fields (cf. the bounding boxes in FIG. 8c) are programmatically read and stored in corresponding variables $pgm_type and $pgm_arch_type. The output of this programmatic reading is shown in the table on the bottom of FIG. 8c. In step 303, the program references are displayed (preferably by invoking the AS/400 command "DSPPGM-REF PGM($library/$program)"), which results in a screen as shown in FIG. 8d. The names of the files used by the program are extracted into a $files[ ] array, as exemplarily shown in the table on the bottom of FIG. 8d. In the example of FIG. 8d, the bounding boxes around the file names "SECTIONS" and "SECTINQ" are the files used by the program. In step 304, the method iterates over the list $files[ ] obtained in step 303 until a file whose "Type of file" equals "Device" and whose "Device type" equals "Display" is found. In a preferred embodiment, this is achieved by the following AS/400 command:

```
For each file $f in $files {
    DSPFD PGM($files[$f].$library/$files[$f].$program)
}
```

Figure 8E:
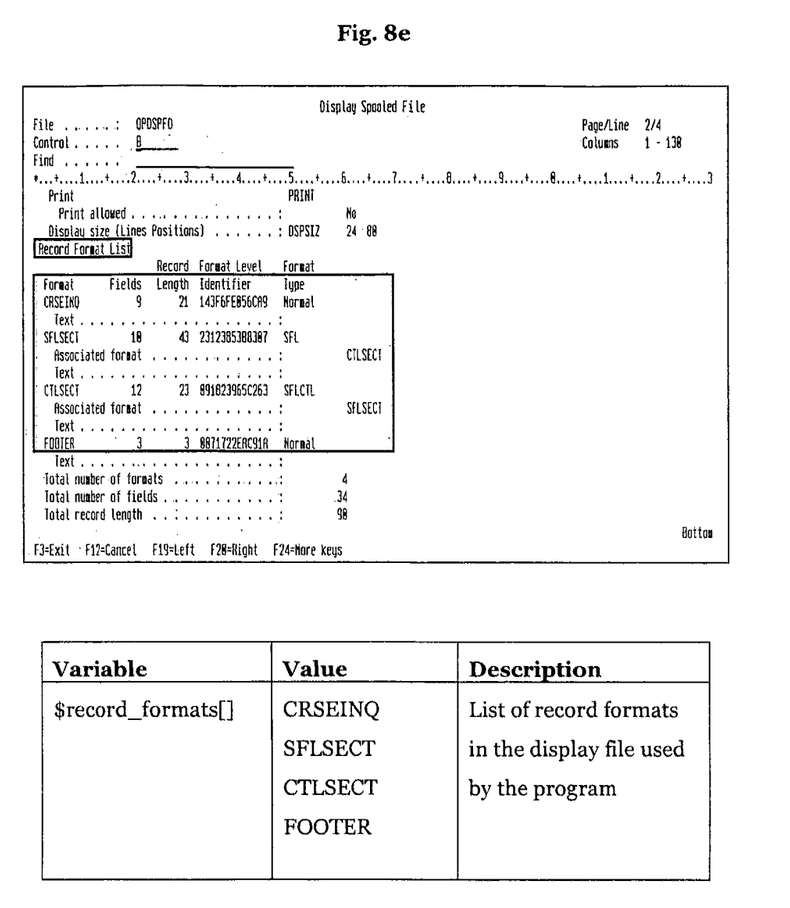

In step 305, the names of the record formats of the display file found in step 304 are extracted into a $record_formats[ ] array, as exemplarily shown in the table on the bottom of FIG. 8e. The record format names are indicated by the bounding box in the screen shown in FIG. 8e.

Figure 5:
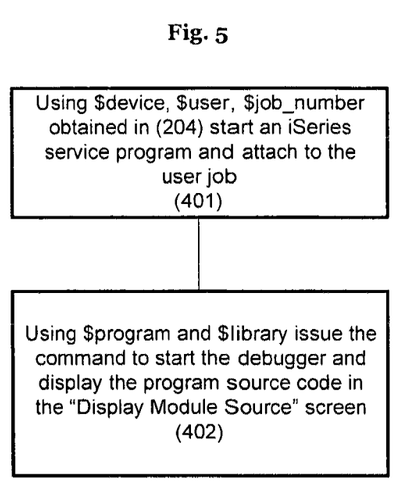
Figure 8F:
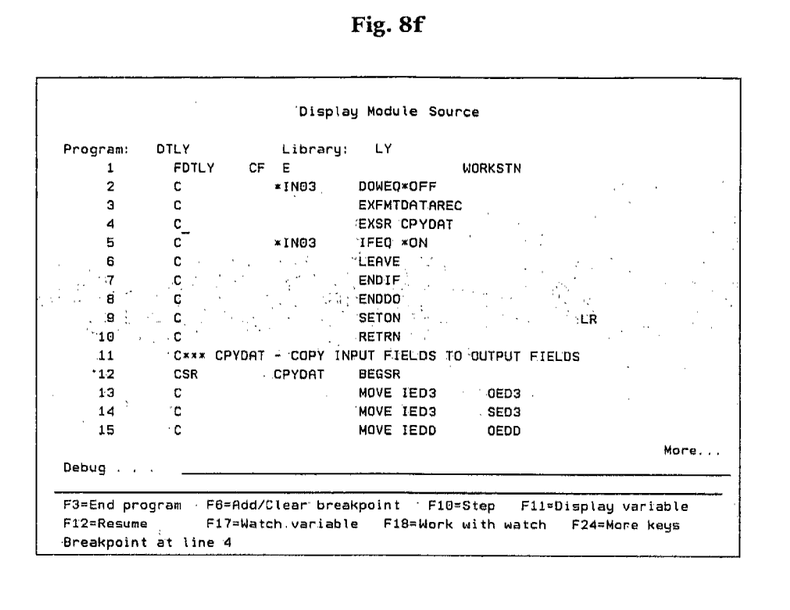

FIG. 5 shows a more detailed view of step 04 "Start the debugger". As can be seen, in step 401 the global variables $device, $user and $job_number obtained in step 204 are used to start an AS/400 service program and to attach the user job thereto. In a preferred embodiment, this is performed by means of the AS/400 command "STRSRVJOB JOB($job_number/$user/$device)". In step 402, the $program and $library variables are used to issue a command to start the debugger and to display the program source code in the "Display Module Source" screen exemplarily shown in FIG. 8f. In a preferred embodiment, this is achieved by means of the AS/400 command for OPM programs

```
"STRDBG PGM($library/$program) UPDPROD(*YES)
OPMSRC(*YES)".
```

Figure 6:
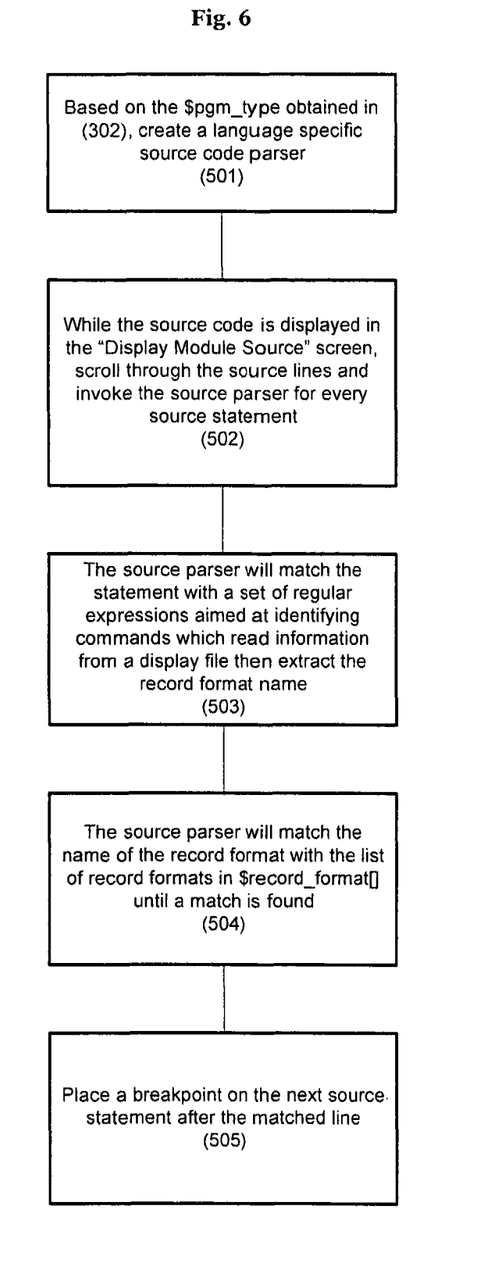

FIG. 6 shows a more detailed view of step 05 "Breakpoint creation". As can be seen, in step 501, the variable $pgm_type obtained in step 302 is used to create a language-specific source code parser. A source code parser is a code module which accepts as input lines of source code and provides as output nothing in case no "READ" command was identified or else the name of the record format being read (cf. also refer step 06 in FIG. 1). In this context, the "READ" command is an abstract term used to indicate a command which instructs the AS/400 display system (or any other supported legacy system) to send a screen to the interactive user and waits to read the reply from the user. Each source language typically has its own "READ" commands (cf. the examples in step 603 further below).

Figure 8G:
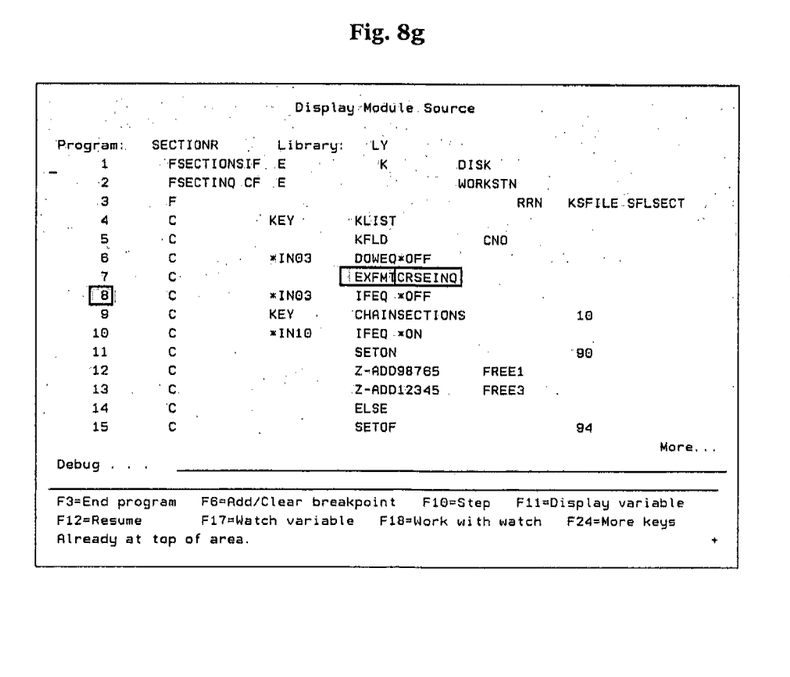
Figure 8H:
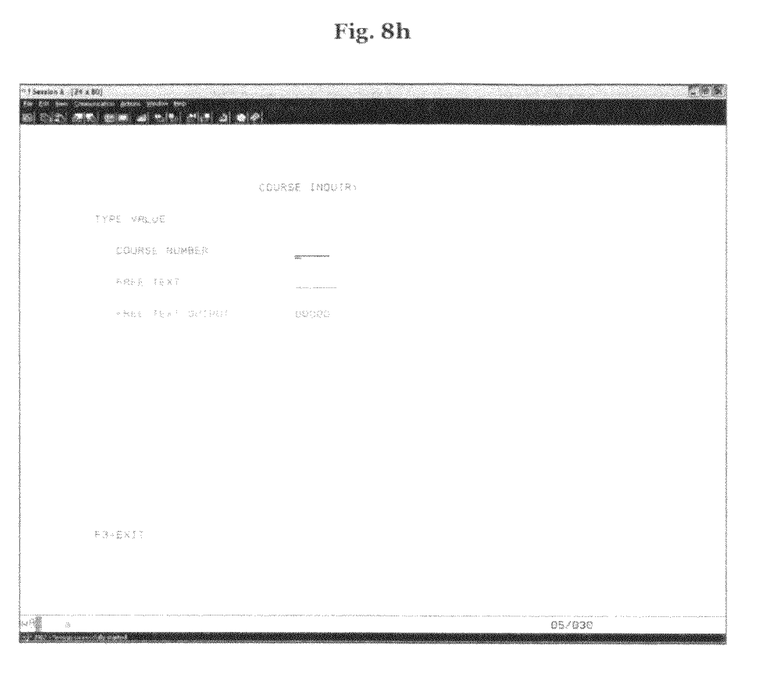
FIG. 8h: An exemplary user "green screen" to be debugged.
Figure 8I:
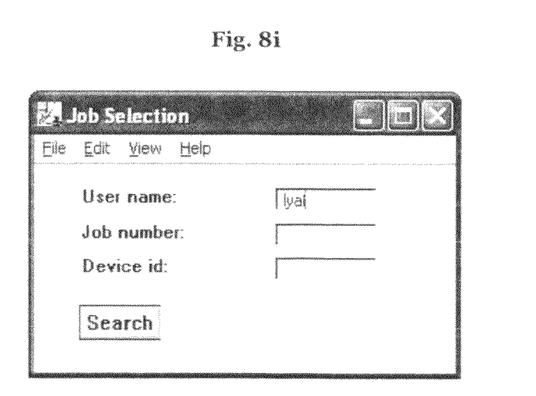
FIG. 8i: A "Job Selection" dialog in accordance with embodiments of the present invention.

While the source code is displayed in the "Display Module Source" screen (cf. FIG. 8f), the method scrolls in step 502 through the lines of source code and invokes the source code parser for every source statement. In step 503, the source code parser matches the encountered source code statement against a set of regular expressions in order to identify commands that read information from a display file. If such a statement is encountered, the corresponding record format name is extracted. In step 504, the source code parser matches the name of the record format with the list of record formats in $record_format[ ] (see above), until a match is found. The above steps 502 to 504 ensure that breakpoints are only set in places were the program interacts with the display (and thus the user) and not set in places where the program interacts with a physical data file that has no visual representation. In step 505, a breakpoint is inserted on the subsequent source code statement after the matched line, as shown in the exemplary "Display Module Source" screen shown in FIG. 8g (wherein the bounding box around the "EXFMT" field indicates the "READ" command, the bounding box around the "CRSEINQ" indicates the record format name and the bounding box around "8" indicates the automatically created breakpoint). As a result, one breakpoint is preferably created after each "READ" command within the source code of the job to be debugged, in order to allow the job to be debugged in every possible situation in which the job interacts with the user.

Returning to FIG. 1, step 06 "Resume Program" is performed by programmatically invoking the "F12" function key on the "Display Module Source" screen (cf. FIGS. 8f and 8g) to resume the user program and allow the user to interact with the screen again. In step 07 "Start debugging", in case in step 05 more than one breakpoint was created, all other breakpoints but the one on which the debugger stopped now are removed. This is necessary since the breakpoint creation method cannot tell exactly which READ command is currently executing, therefore it preferably places breakpoints on all READ commands for record format of the display file used by the program in the source code of the program and therefore it may create obsolete breakpoints. Once a breakpoint following a READ command has been reached by the debugger, the other breakpoints are no longer required and can be removed.

Control is transferred back to the developer (user) in order for the developer to work with the debugger as usual. In step 11 "Work On Screen", the user is working on an AS/400 screen to which the developer needs to attach a debugger. In step 12 "Move to the next screen", the user sends an AID key to the AS/400, which will start the debugging session.

Figure 7:
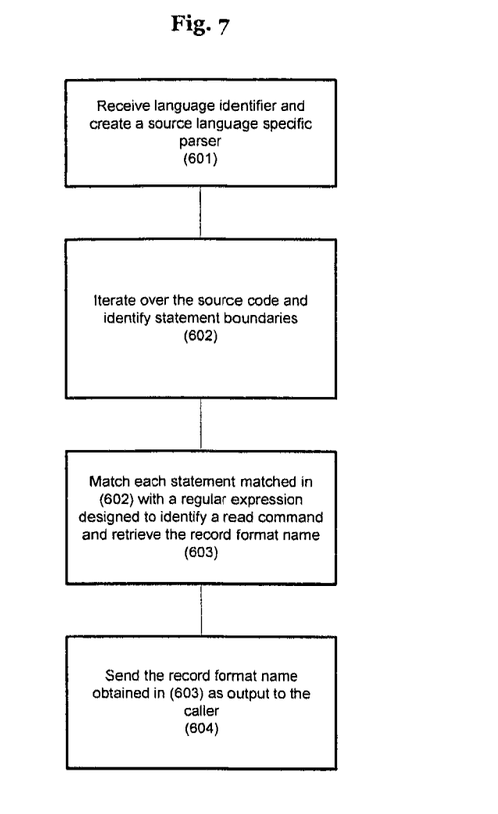

A source code parser as used in the above step 501 is a computer program written specifically to parse source code of another computer program written in a specific programming language. A source parser accepts as input lines of code and a set of regular expressions and emits as output a specific token, as shown in FIG. 7. The present invention provides a set of special purpose source code parsers which are able to identify READ statements in various programming languages, as explained further below.

As can be seen, in step 601 a language identifier is received a source language specific parser is created, preferably by using the $pgm_type and $pgm_arch_type variables obtained in step 302 above. In step 602, the source code parser iterates over the source code and identifies statement boundaries. For example, the statement boundaries in certain programming languages may be identified as follows:

In RPG: end of each line.

In CL: a line which does not end with the plus sign.

In Cobol: statement numbers identify statement boundaries.

In C/C++/Java lexical analysis of the source code is required using tools like Lex and Yacc and a specific language grammar.

In step 603, each statement in step 602 is matched with a regular expression designed to identify a read command and to retrieve the record format name. Examples of regular expressions are:

Identify an RPG display read command:

(.READ |EXFMT)(.{10})

Identify a CL display read command:

SNDRCVF.*RCDFMT\((.*)\)

In step 604, the record format name obtained in step 603 is sent as output of the source code parser to the caller.

The systems, subsystems, services, programmed logic circuitry, etc., herein may be implemented as any suitable combination of software, hardware, firmware, and/or the like. The storage locations herein may be any suitable combination of disk drive devices, memory locations, solid state drives, CD-ROMs, DVDs, tape backups, storage area networks (SANs), etc. The techniques described herein may be accomplished by having a processor execute instructions that may be tangibly stored on a non-transitory computer readable storage medium or the like.

The invention claimed is:

1. A computer-implemented method for debugging a running job on a legacy system, the method comprising:
    identifying the running job to be debugged by programmatically reading a screen, using screen scraping, provided by the legacy system that displays a list of active jobs of the legacy system;
    automatically and programmatically retrieving source code that corresponds to the identified running job;
    determining whether the retrieved source code comprises at least one instruction relating to displaying information on an interactive screen of the legacy system;
    automatically and programmatically creating at least one breakpoint in the retrieved source code after the at least one determined instruction; and
    starting a debugging session at one of the created at least one breakpoint,
    wherein the determining of whether the source code comprises at least one instruction relating to displaying information on an interactive screen of the legacy system is performed by one of a plurality of language-specific source code parsers.

2. The method of claim 1, further comprising filtering the list of active jobs of the legacy system based on at least one selection criterion selected from the group comprising username of a user that initiated the debugging, device name, job number, and/or job status.

3. The method of claim 1, further comprising enabling user selection of the job to be debugged, if the list of active jobs of the legacy system comprises more than one candidate job.

4. The method of claim 1, further comprising identifying a source program language of the job to be debugged, including programmatically reading a screen provided by the legacy system that displays program information of a program associated with the job to be debugged.

5. The method of claim 1, further comprising programmatically invoking at least one command on the legacy system that causes the legacy system to output a screen that displays the source code of the job to be debugged.

6. The method of claim 1, wherein a breakpoint is created after each determined instruction, wherein the method further comprises:
    removing all other breakpoints in accordance with start of the debugging session.

7. A non-transitory computer readable storage medium tangibly storing a computer program for debugging a job running on a legacy system comprising instructions that are, when executed by at least one computer processor, configured to:
    screen scrape a screen provided by the legacy system that displays a list of active jobs of the legacy system so as to identify the job to be debugged;
    automatically and programmatically retrieve source code that corresponds to the identified job to be debugged;
    determine whether the retrieved source code comprises at least one instruction relating to displaying information on an interactive screen of the legacy system; and
    automatically and programmatically create at least one breakpoint in the retrieved source code at the at least one instruction relating to displaying information on an interactive screen of the legacy system,
    wherein determining of whether the source code comprises at least one instruction relating to displaying information on an interactive screen of the legacy system is performed by one of a plurality of language-specific source code parsers.

8. A system for debugging a job running on a legacy system, the system comprising:
    a processing system that includes at least one processor and a memory, the processing system configured to:
        screen scrape a screen provided by the legacy system that displays a list of active jobs of the legacy system so as to identify the job to be debugged;
        automatically and programmatically retrieve source code that corresponds to the identified job to be debugged;
        determine whether the retrieved source code comprises at least one instruction relating to displaying information on an interactive screen of the legacy system; and
        automatically and programmatically create at least one breakpoint in the retrieved source code after the at least one determined instruction relating to displaying information on an interactive screen of the legacy system,
    wherein the determining of whether the source code comprises at least one instruction relating to displaying information on an interactive screen of the legacy system is performed by one of a plurality of language-specific source code parsers.

9. The system of claim 8, wherein the processing system is further configured to filter the list of active jobs of the legacy system based on at least one selection criterion selected from the group comprising username of a user that initiated the debugging, device name, job number, and/or job status.

10. The system of claim 8, wherein the processing system is further configured to identify a source program language of the job to be debugged by programmatically reading a screen provided by the legacy system that displays program information of a program associated with the job to be debugged.

11. The system of claim 8, wherein the processing system is further configured to programmatically invoke at least one command on the legacy system that causes the legacy system to output a screen that displays the source code of the job to be debugged.

* * * * *